(12) United States Patent
Shelor

(10) Patent No.: US 7,363,475 B2
(45) Date of Patent: Apr. 22, 2008

(54) MANAGING REGISTERS IN A PROCESSOR TO EMULATE A PORTION OF A STACK

(75) Inventor: Charles F. Shelor, Arlington, TX (US)

(73) Assignee: Via Technologies, Inc., Taipei (TW)

( * ) Notice: Subject to any disclaimer, the term of this patent is extended or adjusted under 35 U.S.C. 154(b) by 265 days.

(21) Appl. No.: 10/827,662

(22) Filed: Apr. 19, 2004

(65) Prior Publication Data

US 2005/0235093 A1 Oct. 20, 2005

(51) Int. Cl.
*G06F 9/455* (2006.01)
(52) U.S. Cl. .................. 712/227; 712/202; 712/209
(58) Field of Classification Search ............ 712/227, 712/220, 202, 209
See application file for complete search history.

(56) References Cited

U.S. PATENT DOCUMENTS

| | | | | |
|---|---|---|---|---|
| 3,924,245 | A * | 12/1975 | Eaton et al. ............... | 711/219 |
| 5,953,741 | A | 9/1999 | Evoy et al. ................ | 711/132 |
| 6,021,469 | A | 2/2000 | Tremblay et al. .......... | 711/125 |
| 6,026,485 | A | 2/2000 | O'Connor et al. ......... | 712/226 |
| 6,038,643 | A | 3/2000 | Tremblay et al. .......... | 711/132 |
| 6,081,665 | A * | 6/2000 | Nilsen et al. .............. | 717/116 |
| 6,289,418 | B1 | 9/2001 | Koppala .................... | 711/132 |
| 6,725,361 | B1 * | 4/2004 | Rozas et al. ............... | 712/222 |
| 2003/0177328 | A1 | 9/2003 | Naganuma et al. ........ | 711/170 |
| 2003/0188128 | A1 | 10/2003 | Francis ..................... | 712/202 |
| 2003/0192035 | A1 * | 10/2003 | Duesterwald .............. | 717/138 |

OTHER PUBLICATIONS

"Are Java Chips Better Than General-Purpose CPUs? Or Will New Compilers Make Them Obsolete?" Byte.com; Nov. 1996.
"Java Design Aspects" Ahmed El-Mahdy.
"Jazelle™—ARM® Architecture Extensions for Java Applications" ARM Inc.; Mar. 2001.

* cited by examiner

*Primary Examiner*—Tonia L Meonske
(74) *Attorney, Agent, or Firm*—Thomas, Kayden, Horstemeyer & Risley

(57) ABSTRACT

The present invention is generally directed to method and apparatus for emulating a portion of a stack. Certain embodiments of the invention manage a plurality of processor registers to store the top portion of the stack. Data is managed in these registers by managing a pointer that points to a current top-of-stack register. As data is pushed or popped from the stack, the top-of-stack point is incremented or decremented accordingly.

6 Claims, 8 Drawing Sheets

MANAGING REGISTERS IN A PROCESSOR TO EMULATE A PORTION OF A STACK

FIELD OF THE INVENTION

The present invention generally relates to processors, and more particularly to an apparatus and method for managing registers in a processor to emulate a portion of a stack.

BACKGROUND

Processors (e.g., microprocessors) are well known and used in a wide variety of products and applications, from desktop computers to portable electronic devices, such as cellular phones and PDAs (personal digital assistants). As is known, some processors are extremely powerful (e.g., processors in high-end computer workstations), while other processors have a simpler design, for lower-end, less expensive applications and products.

Platform-independent programming languages, such as the "JAVA®" programming language from Sun Microsystems, Inc., offer different structural and operational features than traditional, platform-specific languages. A platform-independent programming language typically utilizes platform-independent program code (machine-readable instructions) suitable for execution on multiple hardware platforms without regard for the particular instruction set for the hardware platforms. A hardware platform typically includes a computer system having one or more processors (e.g., microprocessors or microcontrollers) which execute a particular set of instructions having a specific format, sometimes referred to as a native instruction set. This is in contrast to platform-specific languages, which utilize platform-specific compilers to generate program code that is native to one particular hardware platform. While the same source code may in some instances be compiled by different platform-specific compilers into suitable program code for multiple platforms, the resulting program code is not platform-independent.

One class of instruction sets includes those instruction sets that use a stack-based approach to storing and manipulating data items upon which they act. The stack within a data processing system supporting such a stack-based instruction set may store a sequence of data items, for example operand values, that are placed into the stack in a particular order and then removed from the stack in the reverse of that order. Thus, the last data item to be placed into the stack will also typically be the first data item to be removed from the stack. Stack-based processors may provide a stack consisting of a plurality of addressable stack entries to which data items may be written and from which data items may be read in conjunction with a stack pointer which indicates the current "top" position within the stack. The stack pointer specifies a reference point within the stack memory which identifies the latest data item to be stored into the stack and from which other accesses to the stack may be referenced.

One example of a stack-based instruction set is the Java Virtual Machine® instruction set, as specified by Sun Microsystems Inc. The JAVA programming language seeks to provide an environment in which computer software written in Java can be executed upon many different processing hardware platforms without having to alter the JAVA software.

Another class of instruction sets includes those instruction sets that use a register-based approach to storing and manipulating the data items upon which they act. An example of such register-based systems are the ARM processors produced by ARM Limited of Cambridge, England. ARM instructions execute operations (such as mathematical manipulations, loads, stores, etc) upon operands stored within registers of the processor specified by register fields within the instructions.

Certain data processing systems designed to execute register-based instructions are known to also support execution of stack-based instructions. In such systems, stack-based instructions are converted into a sequence of operations to be executed by the processor core using registers within a register bank or register set. The data items on the stack that are required by those operations are stored from the stack into registers of the register bank so that they are available to the processor core. Typically, a set of registers within the register bank are allocated to hold stack data items (also referred to herein as stack operands) from a portion of the stack. A plurality of different mapping states may be provided in which different registers within the set hold respective stack operands from different positions within the portion of the stack. The mapping state may be changed in dependence upon operations that add or remove stack operands held within the set of registers used for the stack in a manner that provides a function similar to that of a stack pointer within a stack. Such an approach seeks to reduce the processing overhead required to provide stack-like storage within the registers of a register-based processor.

In such a system, the stack entries in the stack may be considered to be of a fixed size, and each register in the set of registers allocated to hold stack operands may be arranged to only store the data corresponding to one stack entry. However, the registers of the processor core that may be devoted to the storage of stack operands may be limited by the need to provide other registers for functions such as the management of the decoding of the stack-based instructions into operations to be executed within the register-based processor, and for the emulation of other control values, such as a variables pointer or a constant pool pointer, that may be found in a stack-based processing system. This means that situations may arise where stack operands held within the set of registers may need to be moved back to the stack to provide room for new stack operands to be placed within the set of registers.

Known systems that use registers to implement a portion of a memory stack realize certain efficiency gains over traditional use of memory stacks, as movement of data among processor registers is faster than movement of data between registers and memory. However, the known implementations have heretofore resulted in a large number of register-to-register transfers. Accordingly, it is desired to provide architectures and methods for emulating stack-based operations in register-based processors, which realize reduced register-to-register transfers and therefore efficiency improvements.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve certain advantages and novel features, the present invention is generally directed to method and apparatus for emulating a portion of a stack. Certain embodiments of the invention manage a plurality of processor registers to store the top portion of the stack. Data is managed in these registers by managing a pointer that points to a current top-of-stack register. As data is pushed or popped from the stack, the top-of-stack pointer is incremented or decremented accordingly.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Figure 1A:
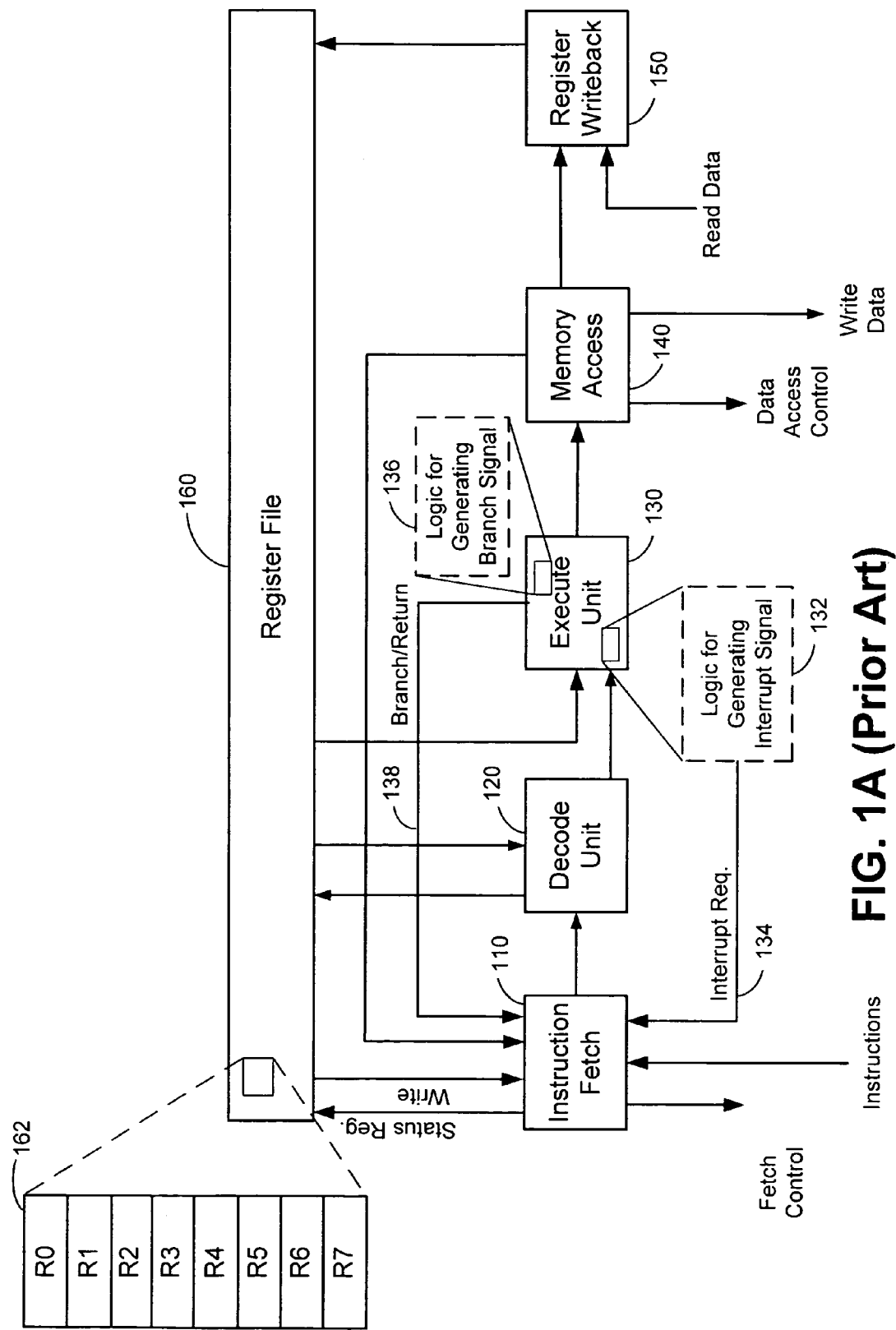
FIG. 1A is a block diagram illustrating certain processing stages within a pipelined processor, as is known in the prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

Referring to FIG. 1A, a block diagram depicts a five stage pipeline processor architecture for executing instructions. Alternative pipeline architectures, having more or fewer pipeline stages and/or differing configurations, may be implemented consistent with concepts and teachings of the present invention. In the architecture of FIG. 1A, illustrated are an instruction fetch unit 110, a decode unit 120, an execute unit 130, a memory access unit 140, and a register writeback unit 150. Except as otherwise described herein, the operation of these units (or logic blocks) is conventional, known by persons skilled in the art, and need not be further described herein.

As is known, an instruction fetch unit 110 performs instruction memory fetches. This unit is configured to determine the value or contents of a program counter (within the register file 160) for in-order instruction execution, as well as exception vectors, branches, and returns. The instruction fetch unit 110 is also configured to determine the return address for all exceptions and branch-link instructions, and write or store that return address into an appropriate register within the register file 160. Addressing of instruction fetches may be through physical addresses directly to memory, or through an instruction cache (not shown) using physical or virtual addresses. Although the internal architecture of the register file 160 is not shown, the register file 160 includes various registers utilized by the processor. As is known, such registers may include general-purpose registers or special-purpose registers (such as status registers, a program counter, etc.). Further, the registers within the register file 160 may be banked or unbanked. As is known, an unbanked register refers to a single physical register that is available in all processor modes of operation. Typically, unbanked registers are completely general-purpose, having no special uses implied by the architecture. Of course, it would be up to the programmer to ensure that the contents of these registers are saved (e.g., pushed to a stack) when changing modes of operation (or when processing branch routines or other subroutines), and restored when returning from a changed mode of operation.

In this regard, the register file 160 may contain a plurality of registers 162 (denoted R0 through R7 in this example) along with a plurality of other registers (not specifically shown), which carry out conventional processor register functions and operations. The registers 162 are configured and controlled to emulate a plurality (in this example 8) of memory locations located at the top of the stack. In essence, registers R0 through R7 retain the top eight data items of the memory stack. Additional discussion will be provided as to the flow and operation of these registers 162 in connection with FIG. 1B.

The decode unit 120 operates to decode instructions passed to it from the instruction fetch unit 110 and generate the necessary control signals for the execute unit 130 to carry out the execution of the particular instruction. The specific architecture of the decode unit 120 is processor dependent, but the general operation and organization of such will be understood by persons skilled in the art. Likewise, the structure and operation of the execute unit 130 is processor dependent, but will be understood by persons skilled in the art. Generally, an execute unit includes circuitry to carry out the execution of instructions as determined by the control signals generated from the decode unit 120.

As illustrated in FIG. 1A, the execute unit 130 of the illustrated embodiment may include logic 132 for generating one or more interrupt signals 134, as well as logic 136 for generating one or more branch signals 138. As the names imply, the interrupt signal 134 indicates an interrupt condition (e.g., IRQ, FIRQ, etc.). Likewise, the branch signal 138 indicates a branch condition (or may also indicate a return from a branch). Indirectly, these signals indicate ensuing out-of-order instructions.

The memory access unit 140 interfaces with external data memory for reading and writing data in response to the instruction being executed by the execute unit 130. Of course, not all instructions require memory accesses, but for those that do, the memory access unit 140 carries out the requisite access to external memory. Such memory access may be direct, or may be made through a data cache using either physical or virtual addressing.

Finally, the register writeback unit 150 is responsible for storing or writing contents (resulting from instruction execution), where appropriate, into registers within the register file 160. For example, consider the execution of an instruction that adds the contents of two general-purpose registers and stores the contents of that addition into a third general-purpose register. After execution of such an instruction, the register writeback unit 150 causes the value obtained in the summation to be written into the third general-purpose register.

Figure 1B:
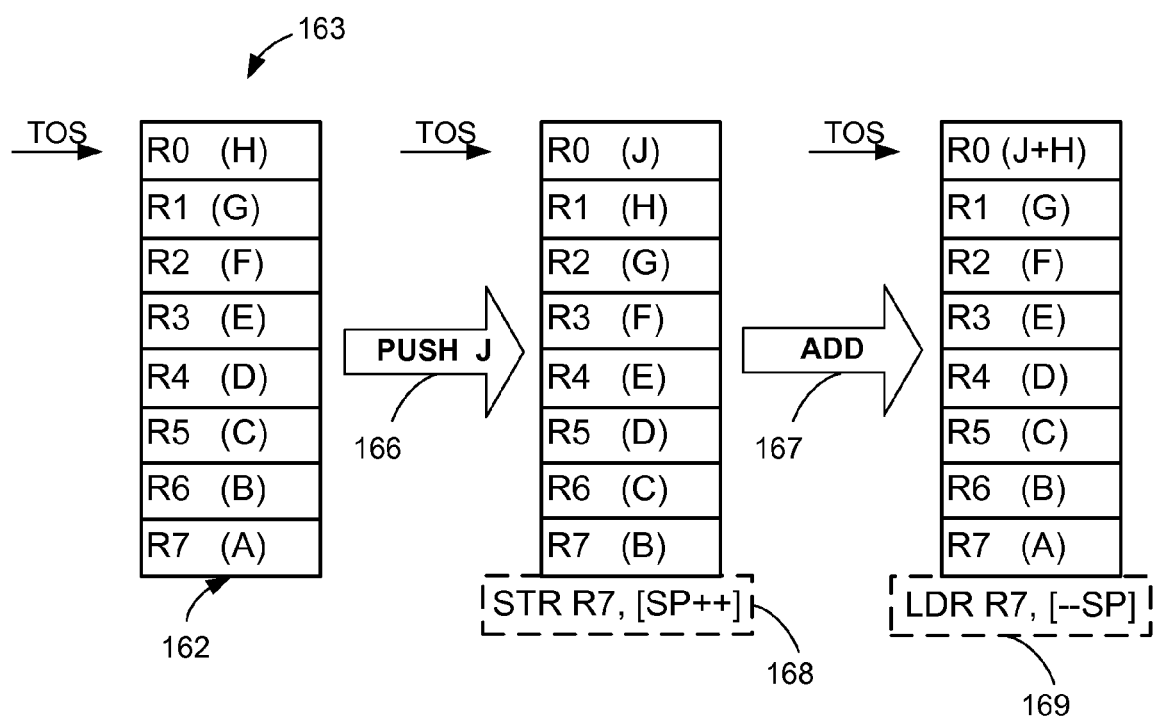
FIG. 1B is a block diagram illustrating certain registers used to emulate a portion of a stack memory, in accordance with an approach known in the prior art.

Reference is now made to FIG. 1B, which illustrates the operation of the registers 162, when simulating the top portion of a memory stack, in known systems. In the particular illustration of FIG. 1B, the contents and movement of data among the stack-emulation registers 162 is illustrated through the execution of PUSH 166 and ADD 167 instructions. In such prior art systems, a given register (R0) is designated as the top location of the memory stack. The next register (R1) is the next location (adjacent the top of stack), and so on. In the first illustrated instance and time (163), the registers contain certain contents, denoted as A through H (where letters A and H represent arbitrary numerical values), wherein the contents of register R7 is A, the contents of register R6 is B, and so through register R0, which has contents H. In response to, for example, a PUSH instruction 166 (or any other instruction, which causes a new data item to be added or pushed to the memory stack), the data (J) being pushed to the stack is stored in register R0, which maintains the top of stack data. Before pushing the contents J into the top of stack register R0, the contents of each of the remaining registers is shifted to the successive register, beginning with register R7. In this regard, the contents (A) of register R7 are stored to memory at a location defined by a memory stack pointer. This may be performed with a store (STR) R7 operation 168. Thereafter, the contents (B) of register R6 may be shifted into register R7, the contents (C) of register R5 may be shifted into register R6, and so on until the contents (H) of register R0 is shifted into register R1. Thereafter, the contents (J) may be pushed onto the top of the stack into register R0.

If, for example, the next successive instruction is an ADD instruction 167, the data (J and H) in the two top locations of the memory stack are added together and stored in the top location of the memory stack (register R0). This frees the next register R1 (as its contents have been used in performing the ADD instruction). Therefore, values in the remaining registers R2 through R7 may be shifted, such that the contents (G) of register R2 may be shifted into now-available register R1, the contents (F) of register R3 may be shifted into register R2, and so on, until the contents (B) of register R7 may be shifted into register R6. This leaves register R7 free and available to receive data that was previously saved off to the remainder stack located in memory, which may be done by performing a load (LDR) operation 169.

The illustration of FIG. 1B in the foregoing discussion illustrates only a minor example of the operation of a conventional memory stack emulated with a plurality of processor registers. It should be appreciated that this design and approach is excessively cumbersome, in that it consumes excessive bandwidth and cycles in shifting data among the various registers (i.e., the ripple shifting associated with push and pop stack operations).

Reference will now be made to embodiments of the present invention, which illustrate improved systems and methods for emulating stack-based operations in a register-based processor. To functionally illustrate the resulting difference, reference is made to FIG. 2, which is a block diagram similar to FIG. 1B, and depicting the execution of the same two instructions 207 and 208. In this regard, contents of eight registers 201 (R0 through R7) are illustrated in three successive instances of time 202, 204, 206 to illustrate the varied contents before and in response to the execution of a PUSH instruction 207 and ADD instruction 208. In the first time instance 202, the contents of registers R0 through R7 are the same as illustrated in time instance 163 of FIG. 1B. Similarly, the top of stack pointer 205 is pointing to register R0. In response to a PUSH instruction 207 (or any instruction that results in data being pushed to the top of the stack), the contents (A) of register R7 is stored to a location in memory, which maintains the remainder of the stack, similar to the operation 168 illustrated and described in connection with FIG. 1B. However, in contrast to the known implementation of FIG. 1B, the contents of R0 through R6 remain unchanged. Instead of ripple-shifting the data contents of these registers, the top of stack pointer 205 is changed to point to register R7. Thereafter, the contents (J) that are being pushed to the stack are written into the register R7. Thereafter, in response to the ADD instruction 208, the contents (J) of the register currently designated as the top location of the emulated stack (register R7) is added to the next successive stack location, which is register R0. The top of stack pointer is then moved (e.g., incremented or decremented) to again point to register R0, whose contents (J+H) now contain the sum of the last two elements pushed to the stack. Thereafter, like the operation 169 of FIG. 1B, a load operation 209 may be performed to retrieve the contents (A) that had been previously saved off to memory, back to the register R7.

Figure 2:
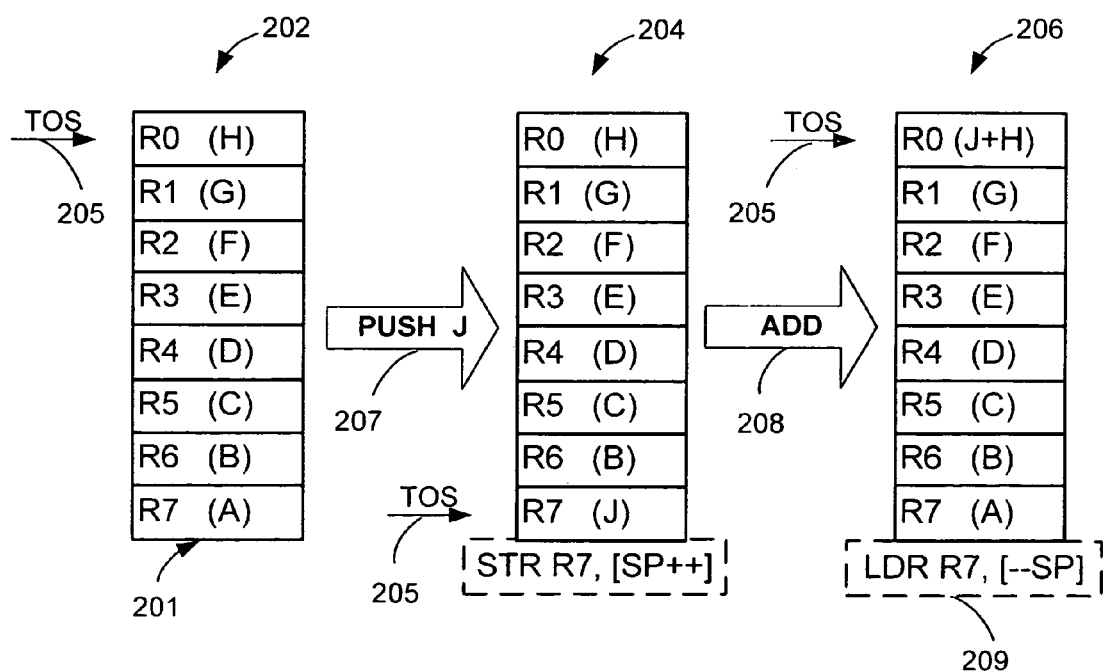
FIG. 2 s a block diagram similar to FIG. 1B, but illustrating operational differences that result from embodiments of the present invention.

It should be appreciated that the operation of the stack emulating registers depicted in FIG. 2 realizes substantial performance and efficiency improvements over the operation of the embodiment depicted in FIG. 1B. Significant benefits are obtained by the effective management of the top of stack pointer 205 to either increment or decrement in response to operations that either push or pop data to or from the memory stack. Effectively managing the top of stack pointer 205 in this way avoids the need for performing numerous shifting operations to shift the contents of the various registers to adjacent registers.

Figure 3:
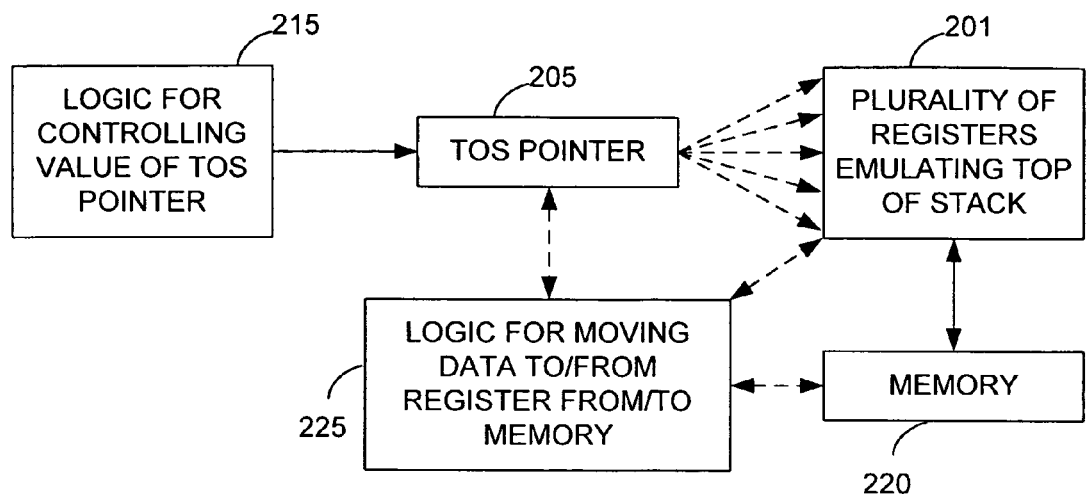
FIG. 3 is a block diagram illustrating certain components utilized in an embodiment of the present invention.

Having described this high level operation, reference is now made to FIG. 3, which is a block diagram illustrating certain basic components of one embodiment of the invention. As illustrated in connection with FIG. 2, a plurality of registers 201 are provided and configured for emulating top positions of a memory stack. In FIG. 2, eight registers were illustrated for emulating the top eight locations or positions of the memory stack. Of course, depending upon a variety of factors of a particular architecture or design, additional or fewer registers may be used to implement this functionality. A top of stack pointer 205 is also provided to point to a current one of the plurality of registers 201, which contains the contents currently residing in the top of the memory stack. In one embodiment, the top of stack pointer 205 may be implemented using a processor register that is loaded with a value (and re-loaded with new values as the value changes). In an alternative embodiment, the top of stack pointer 205 may be implemented as an up/down counter, which is either incremented or decremented to point to successive registers in the plurality of registers 201.

In an embodiment in which eight registers are implemented to emulate the top eight positions of a stack, the least significant three bits of a rollover counter may be used to define the contents of the top of stack pointer 205. In certain embodiments, the counter may be configured to rollover in response to an increment or decrement operation. For example, if the value of the least significant three bits for each one, indicating a value of seven for the top of stack pointer (e.g., pointing to register R7), incrementing the count by one additional count would result in a count of eight (or each of the three least significant bits changing to zero), thereby effectively making the top of stack pointer 205 a value of zero, so as to point to register R0. As will be determined by the architecture and design objectives of any given system or architecture, the organization or implementation of the logic for controlling the value of the pointer may vary accordingly.

In addition, a memory 220 is provided for maintaining the contents of the stack that are not emulated by the plurality of registers 201. In one embodiment, the memory 220 may be implemented and managed in a conventional manner. Logic 225 may also be provided for managing or controlling the movement of data between the plurality of registers 201 and memory 220. That is, as stack-bound data overruns the allocated register space, it is moved to the stack-allocated portion of the memory 220. Similarly, as stack data is read from the allocated registers (popped from the stack), then stack data is moved from the memory 220 into the freed register space.

Figure 4:
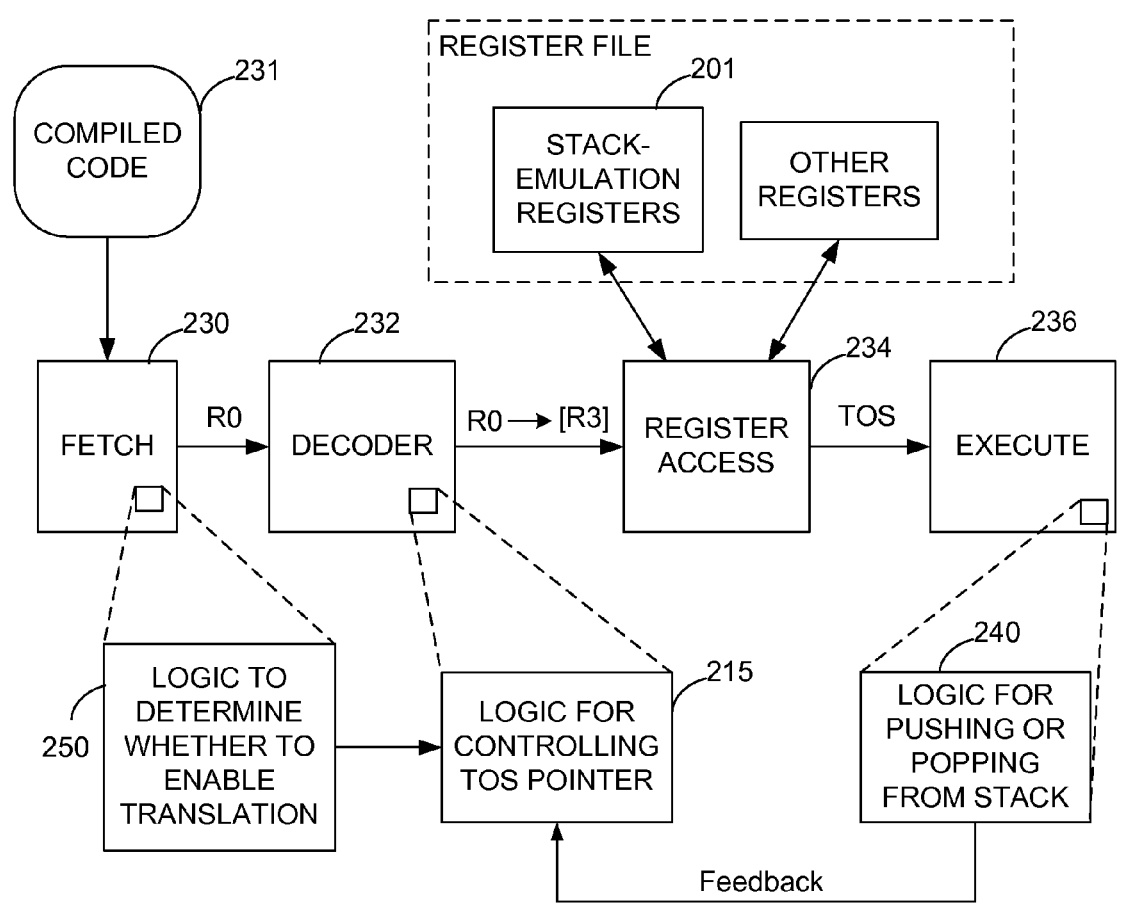
FIG. 4 is a block diagram illustrating components of a processor pipeline, which include logic constructed in accordance with one embodiment of the inventions.

Reference is now made to FIG. 4, which is a block diagram illustrating features implemented in accordance with an embodiment of the present invention. In this regard, FIG. 4 illustrates the fetch 230, decode 232, register access 234, and execute 236 stages of a processor pipeline. In this embodiment, the logic 215 for controlling the top of stack pointer is embodied within the decoder 232. As is known, compiled code 231 is read by the fetch unit 230. The compiled code 231 is generated by a compiler that compiles the code for execution on a conventional apparatus of the type described and illustrated in connection with FIGS. 1A and 1B. As previously describe, a designated register (R0) was always maintained as the top of the stack. Therefore, the logic 215 for controlling the top of stack pointer performs a translation on this pointer to translate register R0, for example, to the register that is currently designated as the top of stack location. If that register was, for example, register R3, then the identification of register R3, instead of R0, would be communicated from the decoder 232 to the register access stage 234. The contents of register R3 would then be retrieved from the stack emulation registers 201 and forwarded to the execute unit 236.

In the embodiment illustrated in FIG. 4, logic 240 is provided within the execute unit 236 for carrying out executions that involved pushes or pops of data to or from the memory stack. Feedback from this logic (or operation) is provided to the logic 215 for controlling the top of stack pointer. In this regard, each time an operation performs either a push to or a pop from the memory stack, then the logic for controlling the top of stack pointer must increment or decrement the value of top of stack pointer accordingly. Also illustrated in FIG. 4 is logic 250 for determining whether to enable or disable the register translation operation (e.g., whether to change the top of stack pointer value). In this regard, there are situations in which the top of stack pointer will be controllably varied in the manner described above, and situations in which it won't. In this regard, in one embodiment of the invention, the decoder 232 may be configured to operate on a plurality of different instruction sets. For example, one instruction set may include 16-bit instructions, a second instruction set may include 32-bit instructions, while a third instruction set may include JAVA® instructions. In such an embodiment, assuming the 16- and 32-bit instructions are not stack-based instructions, then the operation of the invention described above may be disabled during the execution of those type of instructions, while the operation of the invention will be enabled when executing JAVA® or other stack-based instruction operations.

As a practical illustration of the foregoing, consider a cellular phone. Upon power-up, instructions from the 16-bit and/or 32-bit instruction sets may be executed to control the basic operation of the cellular phone. However, if the cellular phone has the ability to download and execute JAVA® based applications, then during the execution of such instruction routines, the inventive aspects described above will preferably be enabled. The logic 250 in cooperation with the logic 215 allow for such controlled enabling and disabling of this inventive feature.

Figure 5:
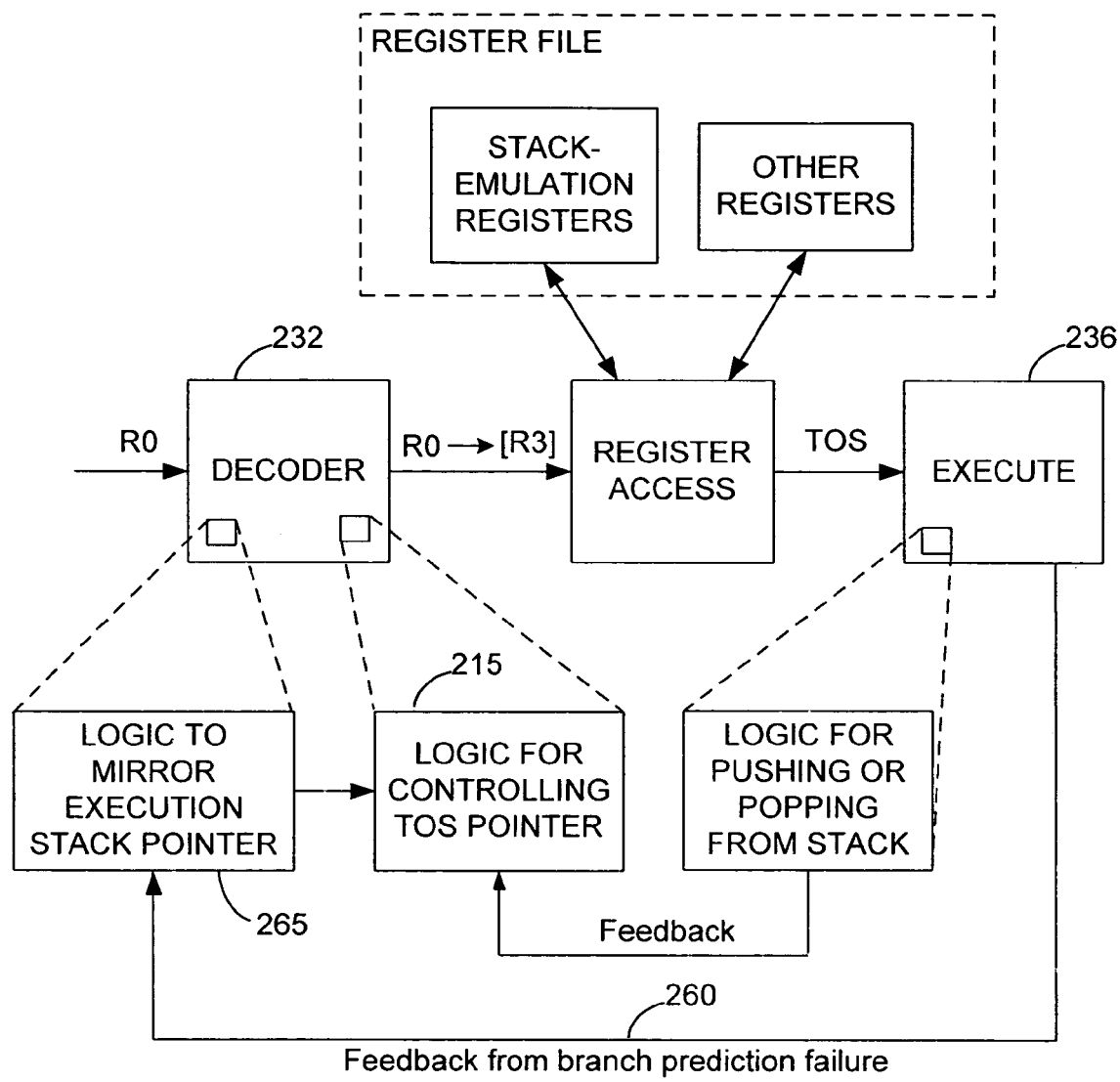
FIG. 5 is a block diagram similar to FIG. 4, illustrating features of an alternative embodiment of the present invention.

Reference is now made to FIG. 5, which is a block diagram similar to that illustrated in FIG. 4, illustrating certain features of another embodiment of the present invention. In this embodiment, feedback 260 is provided from the execute unit 236 to logic 265 within the decoder 232. Specifically, the feedback of 260 is generated from branch prediction failure logic (not specifically shown). As is known, in pipeline processors, branch prediction logic is typically provided so that when fetch and/or decode operations, that take place early in the processor pipeline, encounter a branch instruction, a prediction (or guess) is made as to the flow of instructions following the branch (e.g., whether the branch is taken or not taken). When branch prediction fails, there is typically feedback from the execute unit that may result in the flush of contents from intermediate pipeline stages. Since the intermediate pipeline stages, when implementing the present invention, may include interim top of stack register locations, a partial flush of the pipeline must also ensure the integrity of the top of stack pointer. Therefore, logic 265 may be provided within the decoder 232 for mirroring the execution stack pointer. Therefore, when a partial pipeline flush is carried out, this logic 265 may be used to ensure that the logic 215 may restore a proper pointer location for the top of stack pointer. It should be appreciated from the foregoing discussion, that a variety of other implementations and embodiments may be provided consistent with the scope and spirit of the present invention, and that the appended claims are not specifically limited to the embodiments described herein.

Figure 6:
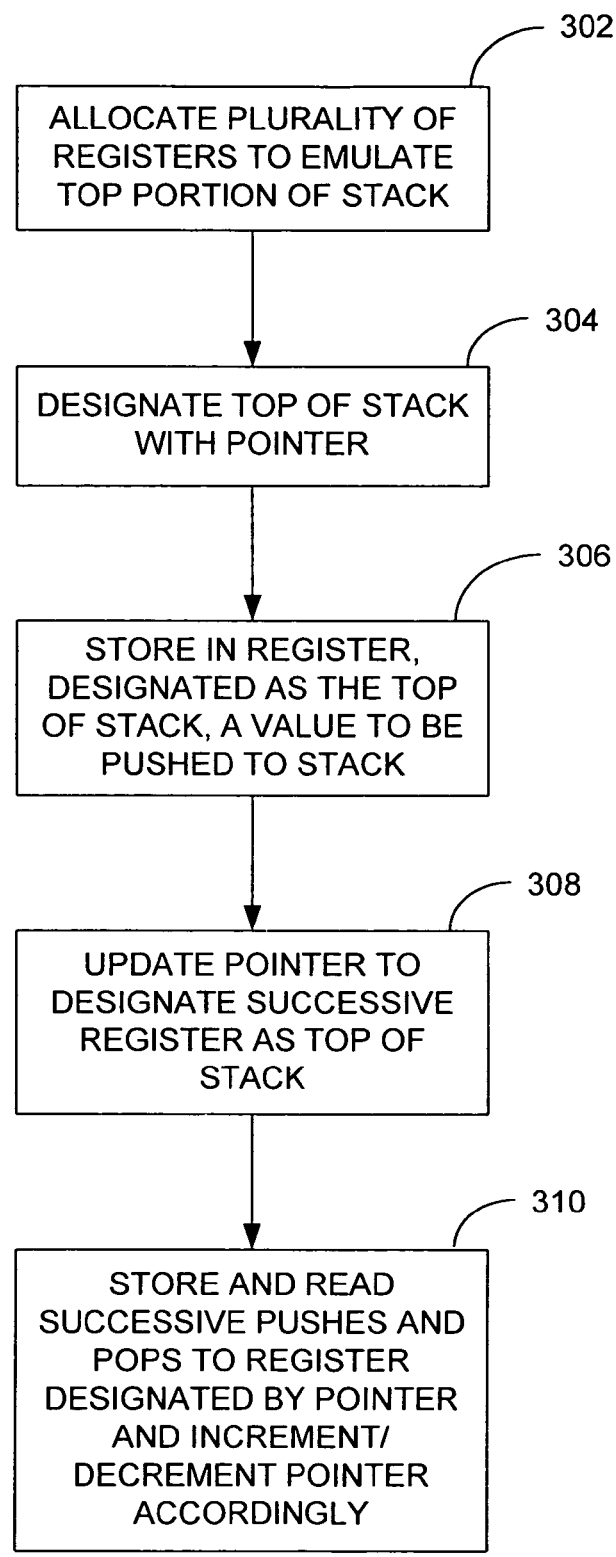
FIG. 6 is a flowchart illustrating the top-level functional operation of an embodiment of the invention.

For example, various methods may be implemented in accordance with the present invention. Reference is made to FIG. 6, which is a flowchart illustrating one such method. In accordance with this method, a method is provided for managing registers in a processor to emulate a portion of a stack. First, a plurality of n registers are allocated to emulate a top n positions of a memory stack (302). A pointer is established to designate one of the n registers as a top of stack location (304). In response to a decoded instruction that calls for a value to be pushed to the stack, the value to be pushed is moved into the register currently designated by the pointer as the top of stack location, while the values in the remaining registers are held intact (306). Then, the top of stack pointer is updated to designate a successive register of the plurality of n registers as the current top of stack location (308). It should be appreciated that the step of updating (described above) could occur after the step of moving or before, depending upon the preferred flow of operation. The foregoing steps may be repeated (310) as additional data is pushed/popped from the stack. Additional steps such as saving register contents from a given register to an external memory, or loading one of the plurality of registers from a stack location within the external memory may also be provided, but are not specifically illustrated in the drawing. In such an operation, the movement of data between the plurality of registers and external memory may be configured to occur either in parallel with certain register operations, or at least outside a critical timing path, so that it does not constitute a bottleneck to register operations.

Figure 7:
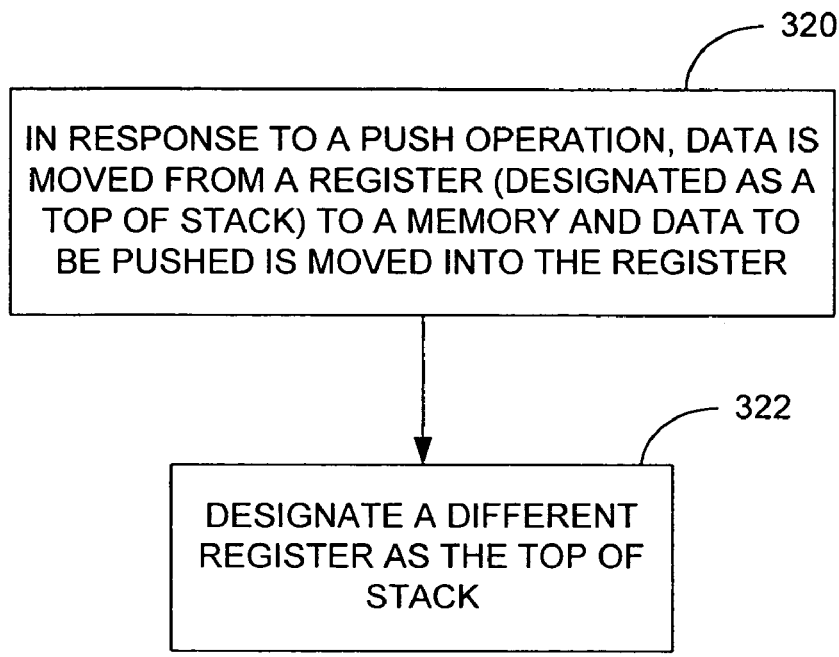
FIG. 7 is a flowchart illustrating the top-level functional operation of another embodiment of the invention.

Reference is now made to FIG. 7, which is a flowchart illustrating an alternative embodiment of the present invention. In this illustrated method, in response to a decoded instruction that calls for a data value to be pushed to the stack, data is communicated out of a register currently designated as a top position of the stack. The value to be pushed into the stack is then moved into the register currently designated as the top of stack register (320). Thereafter, the designation of the top of stack register is modified to designate a successive register as the top of stack register (322). In one embodiment, the top of stack register is designated by the use of a pointer, which may be implemented as a simple register, or as an increment/decrement counter, as described above.

Figure 8:
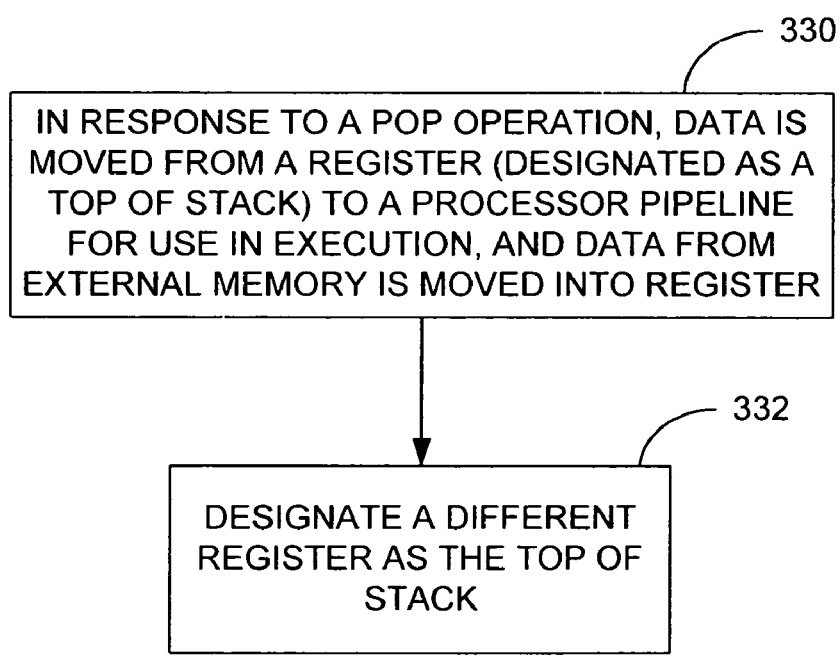
FIG. 8 is a flowchart illustrating the top-level functional operation of another embodiment of the invention.

Reference is now made to FIG. 8, which is a flowchart illustrating a similar embodiment of the invention that manages a plurality of registers to emulate a top portion of a stack in response to a pop operation. In this regard, in response to the decoding of an instruction that calls for a data value to be popped from the stack, the contents of the register currently designated as the top position of the stack is transferred out of that register (e.g., into the execute stage of the processor pipeline) (330). Then, data is communicated from an external memory into the register currently designated as the top position of the stack (332). Thereafter, a top of stack pointer is updated to designate a successive register as containing the top of stack value.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A processor comprising:
    execution logic for executing instructions from a plurality of instruction sets;
    indication logic for indicating whether a current instruction is an instruction of a Java instruction set;
    managing logic responsive to the indicating logic for managing a plurality of registers within the processor to emulate top locations of a stack;
    designating logic configured to designate one of the plurality of registers as a top-of-stack location, at a current time; and
    updating logic configured to update the designated top-of-stack location register in response to an instruction that calls for data to be moved to or from the stack such that, for any single data movement to or from the stack, data in only one of the plurality of registers is changed, and data values in the remaining registers of the plurality of registers are unchanged such that shifting of successive registers is avoided.

2. The processor of claim 1, wherein the updating logic is configured so that the updating occurs such that the plurality of registers are individually designated as the top-of-stack location in a sequential and circular fashion.

3. The processor of claim 1, wherein the indication logic comprises a single control bit.

4. The processor of claim 1, wherein the designating logic comprises a pointer.

5. The processor of claim 1, further comprising logic for managing data exchanges between the plurality of registers and external memory, as the stack size grows to exceed the size that can be accommodated by the plurality of registers.

6. The processor of claim 5, wherein the managing logic is configured to manage such exchanges outside of a critical timing path, such that the functional processing operations, which are defined by instructions being executed, are not delayed.

* * * * *